US007574712B2

(12) United States Patent
Allamaraju et al.

(10) Patent No.: US 7,574,712 B2
(45) Date of Patent: Aug. 11, 2009

(54) USER INTERFACE FOR CONFIGURING WEB SERVICES FOR REMOTE PORTLETS

(75) Inventors: Subrahmanyam Allamaraju, Longmont, CO (US); Melissa Dawe, Boulder, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 546 days.

(21) Appl. No.: 11/281,183

(22) Filed: Nov. 16, 2005

(65) Prior Publication Data

US 2006/0136588 A1 Jun. 22, 2006

Related U.S. Application Data

(60) Provisional application No. 60/630,124, filed on Nov. 22, 2004.

(51) Int. Cl.
*G06F 3/00* (2006.01)

(52) U.S. Cl. ....................... 719/318; 709/217; 709/219; 709/223; 709/224; 709/250; 707/2; 707/3; 707/9; 707/104.1; 715/760; 715/764; 715/742; 715/846; 705/59; 705/51; 705/57

(58) Field of Classification Search .................. 719/318
See application file for complete search history.

(56) References Cited

U.S. PATENT DOCUMENTS

| | | | | |
|---|---|---|---|---|
| 6,192,382 | B1 * | 2/2001 | Lafer et al. | 715/205 |
| 6,314,456 | B1 * | 11/2001 | Van Andel et al. | 709/218 |
| 6,760,047 | B2 * | 7/2004 | Hough et al. | 715/753 |
| 6,763,353 | B2 | 7/2004 | Li et al. | |
| 6,871,197 | B1 * | 3/2005 | Johnson | 706/61 |
| 6,918,090 | B2 * | 7/2005 | Hesmer et al. | 715/760 |
| 6,973,619 | B1 * | 12/2005 | Hirose et al. | 715/234 |
| 6,985,939 | B2 * | 1/2006 | Fletcher et al. | 709/223 |
| 7,035,944 | B2 * | 4/2006 | Fletcher et al. | 709/250 |
| 7,146,563 | B2 * | 12/2006 | Hesmer et al. | 715/223 |
| 7,266,600 | B2 * | 9/2007 | Fletcher et al. | 709/223 |
| 7,313,601 | B2 * | 12/2007 | Fischer et al. | 709/217 |

(Continued)

FOREIGN PATENT DOCUMENTS

JP 2003036197 2/2003

(Continued)

OTHER PUBLICATIONS

Schaeck, Thomas, Web Services for Remote Portals (WSRP), Sep. 22, 2002.*

(Continued)

*Primary Examiner*—Firmin Backer
*Assistant Examiner*—Arvin Eskandarnia
(74) *Attorney, Agent, or Firm*—Fliesler Meyer LLP

(57) ABSTRACT

In accordance with embodiments, there are provided mechanisms and methods for improved event communications between producer(s) and consumer(s) of content to communicate regarding changes to a web portal framework. Methods and mechanisms providing improved event communications between producer(s) and consumer(s) can provide producers with the capability to detect event descriptions within a configuration of the portlet and add a description for the event to a web services descriptor for the portlet. The producer and consumer can then utilize the event description to communicate with the portlet. During an interaction request the consumer and producer can utilize the event description to inform one another of transpiring events.

17 Claims, 7 Drawing Sheets

U.S. PATENT DOCUMENTS

| | | | | |
|---|---|---|---|---|
| 7,343,428 | B2 * | 3/2008 | Fletcher et al. | 709/250 |
| 7,346,923 | B2 | 3/2008 | Atkins et al. | |
| 7,373,422 | B1 * | 5/2008 | Paul et al. | 709/238 |
| 2001/0009016 | A1 * | 7/2001 | Hofmann et al. | 709/219 |
| 2002/0052954 | A1 * | 5/2002 | Polizzi et al. | 709/225 |
| 2002/0055956 | A1 * | 5/2002 | Krasnoiarov et al. | 707/513 |
| 2002/0083132 | A1 * | 6/2002 | Holland et al. | 709/203 |
| 2002/0091732 | A1 * | 7/2002 | Pedro | 707/505 |
| 2002/0111992 | A1 * | 8/2002 | Copeland et al. | 709/203 |
| 2002/0112032 | A1 * | 8/2002 | Martin et al. | 709/219 |
| 2002/0116362 | A1 | 8/2002 | Li et al. | |
| 2002/0129354 | A1 | 9/2002 | Bryan et al. | |
| 2002/0152239 | A1 * | 10/2002 | Bautista-Lloyd et al. | 707/513 |
| 2002/0169852 | A1 * | 11/2002 | Schaeck | 709/218 |
| 2002/0194388 | A1 * | 12/2002 | Boloker et al. | 709/310 |
| 2003/0050969 | A1 * | 3/2003 | Sant et al. | 709/203 |
| 2003/0101412 | A1 * | 5/2003 | Eid | 715/513 |
| 2003/0149722 | A1 * | 8/2003 | Jolley et al. | 709/203 |
| 2003/0163513 | A1 * | 8/2003 | Schaeck et al. | 709/201 |
| 2003/0167315 | A1 * | 9/2003 | Chowdhry et al. | 709/218 |
| 2003/0191669 | A1 | 10/2003 | Fitzgerald et al. | |
| 2004/0010755 | A1 * | 1/2004 | Hamada | 715/513 |
| 2004/0034626 | A1 * | 2/2004 | Fillingham et al. | 707/3 |
| 2004/0193424 | A1 * | 9/2004 | Dames et al. | 704/270.1 |
| 2004/0205533 | A1 * | 10/2004 | Lopata et al. | 715/507 |
| 2004/0225995 | A1 * | 11/2004 | Marvin et al. | 717/100 |
| 2004/0230901 | A1 * | 11/2004 | Godwin et al. | 715/513 |
| 2004/0250118 | A1 * | 12/2004 | Andreev et al. | 713/201 |
| 2004/0261032 | A1 * | 12/2004 | Olander et al. | 715/747 |
| 2005/0005243 | A1 * | 1/2005 | Olander et al. | 715/747 |
| 2005/0028105 | A1 * | 2/2005 | Musson et al. | 715/744 |
| 2005/0050065 | A1 * | 3/2005 | Wilson et al. | 707/100 |
| 2005/0060721 | A1 | 3/2005 | Choudhary et al. | |
| 2005/0065797 | A1 * | 3/2005 | Haenel | 704/270.1 |
| 2005/0074098 | A1 | 4/2005 | O'Brien et al. | |
| 2005/0108034 | A1 * | 5/2005 | Musson et al. | 705/1 |
| 2005/0108258 | A1 * | 5/2005 | Olander et al. | 707/100 |
| 2005/0108647 | A1 * | 5/2005 | Musson et al. | 715/744 |
| 2005/0108648 | A1 * | 5/2005 | Olander et al. | 715/744 |
| 2005/0108699 | A1 * | 5/2005 | Olander et al. | 717/166 |
| 2005/0108732 | A1 * | 5/2005 | Musson et al. | 719/328 |
| 2005/0132072 | A1 * | 6/2005 | Pennell et al. | 709/228 |
| 2005/0144269 | A1 * | 6/2005 | Banatwala et al. | 709/223 |
| 2005/0175015 | A1 * | 8/2005 | Ramaswamy et al. | 370/395.52 |
| 2005/0177815 | A1 | 8/2005 | Kurz et al. | |
| 2005/0187978 | A1 * | 8/2005 | Qian et al. | 707/104.1 |
| 2005/0198196 | A1 * | 9/2005 | Bohn et al. | 709/217 |
| 2005/0262429 | A1 * | 11/2005 | Elder et al. | 715/507 |
| 2006/0005163 | A1 * | 1/2006 | Huesken et al. | 717/107 |
| 2006/0010390 | A1 | 1/2006 | Guido et al. | |
| 2008/0091985 | A1 | 4/2008 | Haynes et al. | |

FOREIGN PATENT DOCUMENTS

| | | |
|---|---|---|
| WO | 03025796 | 3/2003 |

OTHER PUBLICATIONS

Agrawal, A Service-Oriented Architecture for Rapid Development of Web Applications, 2001,ACM.*

Meg Murray, Ph.D., An investigation of specifications for migrating to a Web portal framework for the dissemination of health information within a public health network, 2002, IEEE computer Society.*

Agrawal, R., "Vinci: A Service-Oriented Architecture for Rapid Development of Web Applications," May 1-5, 2001, ACM, pp. 355-365.

Murray, M., Ph.D., "An Investigation of Specifications for Migrating to a Web Portal Framework for the Dissemination of Health Information Within a Public Health Network," Proceedings of the 35th Hawaii Int'l Conference on System Sciences, 2002, IEEE Computer Society, 9 pages.

* cited by examiner

USER INTERFACE FOR CONFIGURING WEB SERVICES FOR REMOTE PORTLETS

CLAIM OF PRIORITY

The present application claims the benefit of:

U.S. Provisional Patent Application No. 60/630,124, entitled SYSTEMS AND METHODS FOR IMPLEMENTING INTER-PORTLET COMMUNICATIONS, by Subbu Allamaraju, filed Nov. 22, 2004, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

The following commonly owned, co-pending United States Patents and Patent Applications, including the present application, are related to each other. Each of the other patents/applications are incorporated by reference herein in its entirety:

U.S. patent application Ser. No. 11/280,657 entitled SYSTEM METHOD FOR EVENT BASED INTERPORTLET COMMUNICATIONS, by Christopher Jolley, et al., filed on Nov. 16,2005, Attorney Doctet No. BEAS 1748US1;

U.S. patent applicaticn Ser. No. 11/280,659 entitled SYSTEM AND METHOD FOR IMPROVED INTERPORTLET COMMUMCATIONS, by Christother Jolley, et al., filed on Nov 16, 2005, Attorney Docket No. BEAS 1748US2;

U.S. patent application Ser. No. 11/281,183 entitled IMPROVED USER INTERFACE FOR CONFIGURING WEB SERVICES FOR REMOTE PORTLETS, by Subrahmanyam Allamaraju , et al., filed on Nov. 16, 2005, Attorney Docket No. BEAS 1749US0; and U.S. patent application Ser. No. 11/280,658 entitled SYSTEM METHOD FOR IMPROVED REMOTE PORTLET COMMUNICATIONS, by Subrahmanyam Allamaraju, et al., filed on Nov. 16 2005, Attorney Docket No. BEAS 1749US1.

INCORPORATION BY REFERENCE

The Web Services for Remote Portlets standard version 1.0, by the OASIS Group is incorporated herein by reference in its entirety.

FIELD OF THE INVENTION

The present invention relates broadly to the delivery of web portal content. The present invention relates more particularly to systems, methods, and computer readable media for implementing the communications between producer systems, remote portlets, and consumer systems.

BACKGROUND OF THE INVENTION

During the past five years, web portals, which provide access to a variety of applications and content through a single location, have become increasingly popular. One ongoing need has been the ability for providers of web applications to utilize a wide range of applications without having to set up an elaborate support framework for the applications.

The Web Services for Remote Portlets (WSRP) standard by the OASIS group has enabled the delivery of functional applications from producer sites to consumer sites. However, the implementation of WSRP has presented considerable difficulties. Additionally, as web portals become more complex there has been a need to coordinate activity among the different elements of the web portal. Particularly, individual portlets can often be affected by the behavior of the larger portal framework or other portlets.

However, there is no robust mechanism for notifying remote portlets of events occurring within the larger portal framework. What is needed is an improved mechanism for inter-portlet communication in a web services environment.

DETAILED DESCRIPTION

Figure 1:
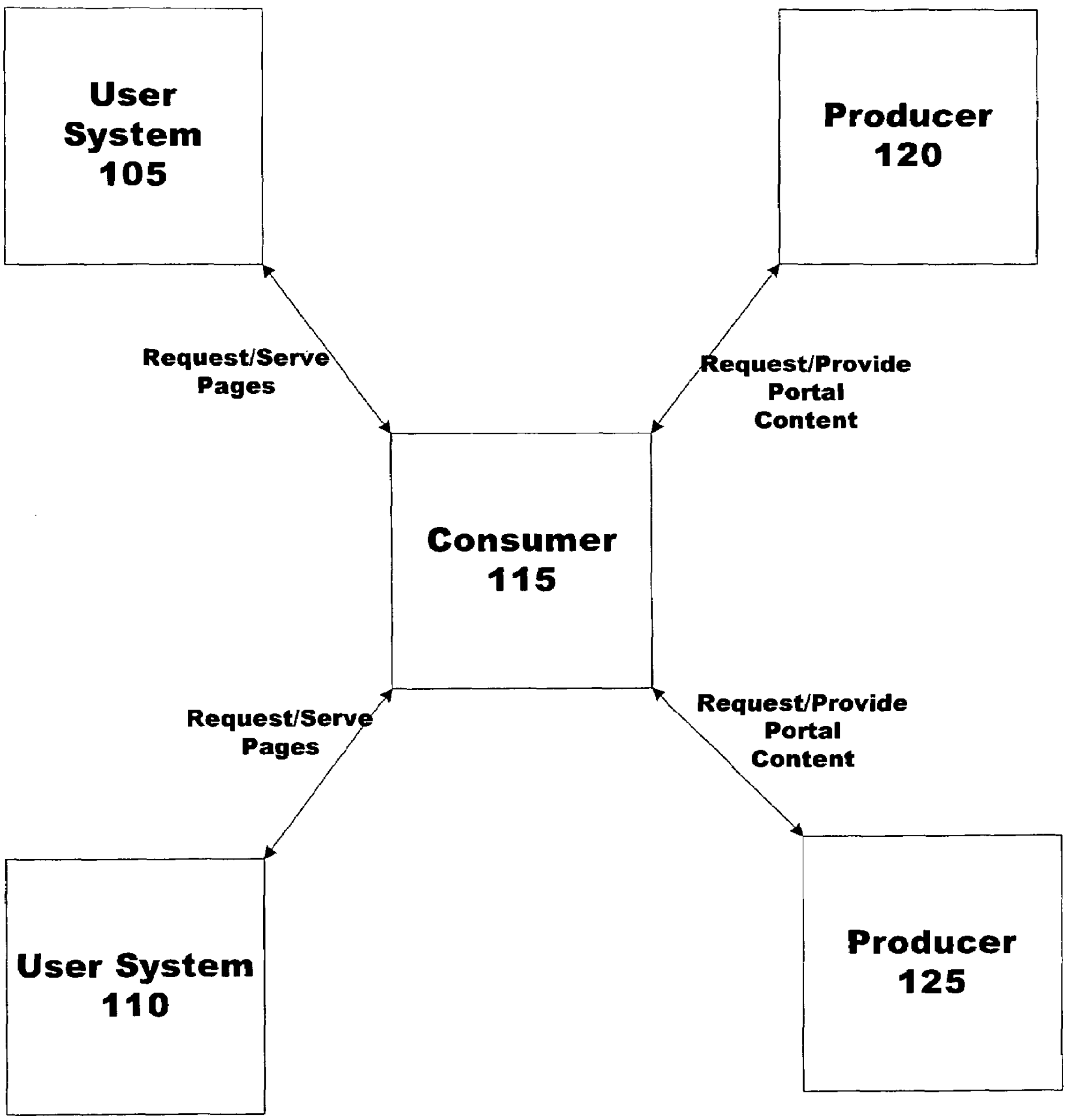
FIG. 1 is a block diagram illustrating an overview of the interaction between a consumer system, user systems, and producer systems in an embodiment.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for improved event communications between producer(s) and consumer(s) of content to communicate regarding changes to a web portal framework. As used herein, the term web services system refers to methods and mechanisms that enable web servers to serve pages that utilize remote portlets. As used herein, the term consumer system refers to methods and mechanisms that serve pages that utilize remote portlets stored on one or more producer systems. Methods and mechanisms providing improved event communications between producer(s) and consumer(s) can provide producers with the capability to detect event descriptions within a configuration of the portlet and add a description for the event to a web services descriptor for the portlet. The producer and consumer can then utilize the event description to communicate with the portlet. During an interaction request the consumer and producer can utilize the event description to inform one another of transpiring events.

In an embodiment and by way of example, a method for enabling a portlet to function with a remote consumer system is provided. The method embodiment includes detecting one or more event data structures within a descriptor file for the portlet. Each of the one or more event data structures describes at least one event occurring within a web portal environment comprising at least the portlet and the remote consumer system. For each of the event data structures in the portlet, a corresponding data structure is generated within a service description for the remote consumer system. The service description configured to enable the remote consumer system to communicate with the portlet.

While the present invention is described with reference to an embodiment in which techniques for communications between producer(s) and consumer(s) of content are implemented using executable programs written in the Java™ programming language, the present invention is not limited to the Java™ programming language. (Java™ is a trademark of Sun Microsystems, Inc.) Embodiments may be practiced using other interconnectivity specifications or programming languages, i.e., JSP and the like without departing from the scope of the embodiments claimed.

FIG. 1 illustrates an overview of the interaction between a consumer system, user systems, and producer systems in an embodiment. Producer systems 120, 125 can store one or more portlet applications that are utilized by user systems 105, 110 through a consumer system 115. In some embodiments, the producer systems can maintain web portals. In alternate embodiments, the producer systems perform other functions or merely serve to provide access to portlets. The user systems 105, 110 are systems remote to the consumer 115 that are utilized by end users and include web page viewing capabilities.

The consumer 115 is a network accessible system that serves web pages, content, and applications to other parties. The consumer 115 can serve its own content in addition to content stored on the producers 120, 125. The consumer 115 presents a web interface to the user systems that utilizes applications stored both locally and on the producers 120, 125. The consumer serves pages that utilize remote portlets on the producers through proxy portlets and allow the consumer to utilize the remote portlets' functionality. The proxy portlets are references to remote portlets that are stored within the web pages on the consumer that cause the portlets to appear within the consumer web pages.

During a registration phase, the consumer 115 registers with a producer 120. In one embodiment, the producer 120 identifies each consumer with a unique handle that enables the producer 120 to identify what portlets are available to a particular consumer. In some embodiments, the consumer does not register with the producer 120. The producer can provide a service description to the consumer 115 that indicates properties of the producer 120 and lists the available portlets that are stored on the producer 120. During a description phase, the producer 115 also provides a Web Services Description Language (WSDL) file indicating data types and message protocols to be used for interacting with the producer 120. This process is described in greater detail with respect to FIG. 2.

When a user system 105 establishes contact with the consumer 115, the consumer aggregates pages, and stores proxy portlets in the pages that access remote portlets on the producer 120. The user system 105 can send a page request to the consumer 115 for a page that includes remote portlets that utilize the producer. When the consumer 115 receives such a request from the user system 105, the consumer 115 sends a request for the data that appears in the page to the producer 120. The producer 120 returns the data, which the consumer integrates into a single user interface and presents to the end user system 105.

Figure 2:
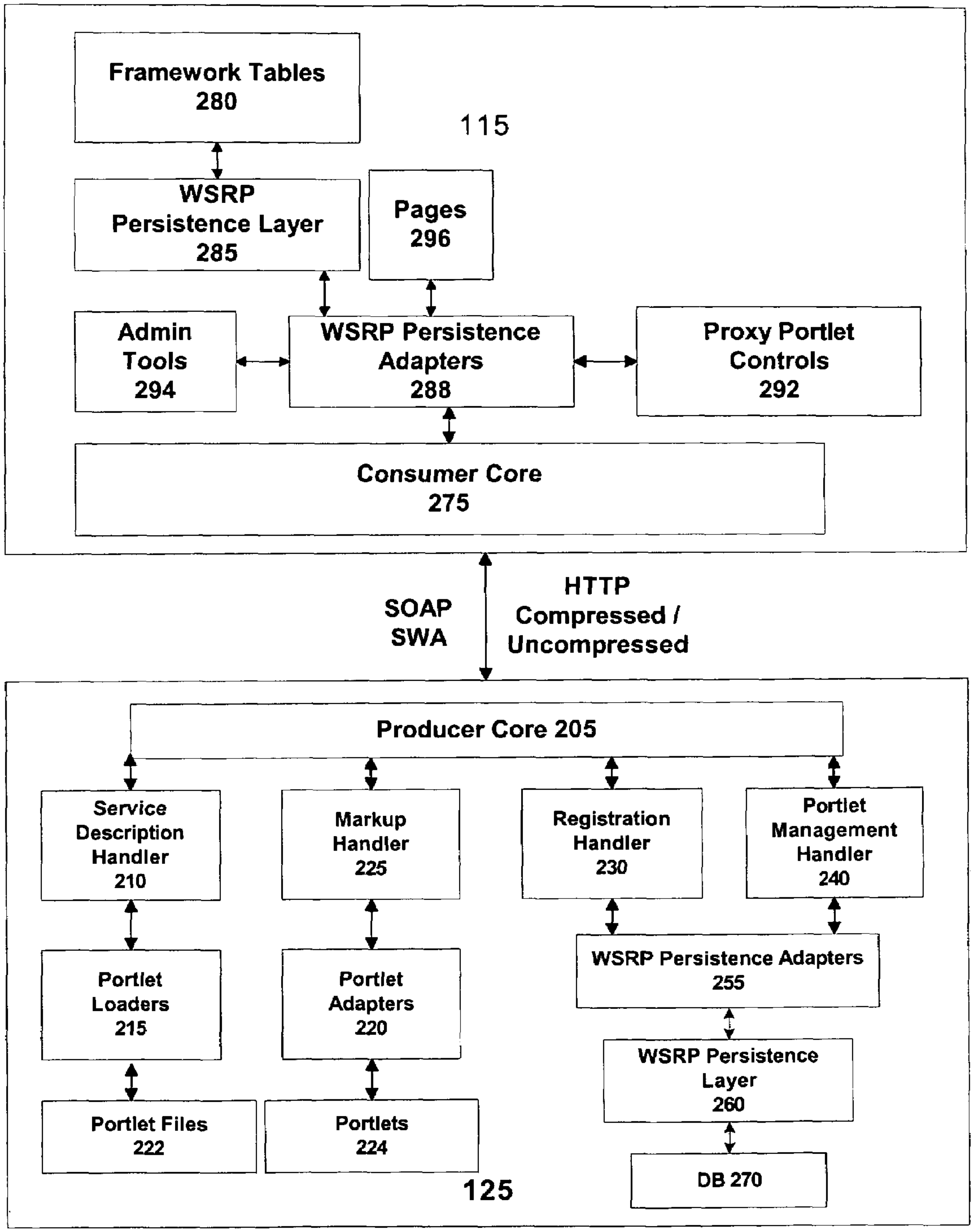
FIG. 2 is a block diagram illustrating another overview of a consumer and a producer in an embodiment.

FIG. 2 is a block diagram illustrating a more detailed view of a consumer 115 and a producer 125 in an embodiment. The producer 125 includes a producer core 205, a service description handler 210, portlet loaders 215, portlet adapters 220, portlet files 222, a markup handler 225, a registration handler 230, a portlet management handler 240, WSRP persistence adapters 255, persistence layers 265, one or more portlets 224, a server module 242, and a database (DB) 270.

The producer core 205 is an application such as a servlet that is configured to reside on the producer and communicates with the consumer 115. The producer core 205 generates the WSDL files that indicate the parameters of communication between the producer 125 and the consumer 115 and transmits a file to the consumer 115 or otherwise provides the parameters to the consumer. These parameters can include data types and messaging protocols and can be preconfigured or user-selected.

The producer 205 additionally includes a service description handler 210. The service description handler 210 is responsible for providing a listing of portlets 224 that are available to consumers. The service description handler utilizes the portlet loaders 215 to load the portlet files 222. The portlet files 222, which define the available portlets, are either portlet files or files created from a deployment descriptor such as a portlet.xml file. In some embodiments, the portlet loaders 215 include separate loaders for different types of portlets such as Java Page Flow (JPF) portlets, Struts portlets, Java Specification Request (JSR) 168 base portlets, and Java portlets. Struts portlets are portlets that utilize the Struts framework layer from the Apache Software Foundation. JPF portlets are portlets that utilize Page Flows to separate interface content from navigation control and other functional logic. In some embodiments, the JPF portlets on the producer can support nested page flows. Nested page flows are page flows that can be utilized temporarily without discarding a currently executing page flow. While the above portlets types are used as examples throughout this application, it should be understood that any portlet type is supported.

The service description handler 210, through the producer core returns to the consumer 115 a list of available portlets in the form of an array of PortletDefinition classes or some other format. The PortletDefinition classes include a portletHandle identifier that identifies the portlet and modes, states, MIME types, a title, and a description for each portlet. Other information can also be provided.

A registration handler 270 registers consumers with the producer 125 so that the consumers can access portlets on the producer 125. The registration process entails the consumer 115 providing certain predetermined identification information to the producer 125. In some embodiments, the producer does not register the consumer. The consumer registration information can be stored in the database 270 through the persistence adapters 255 and persistence layer 265.

The portlet management handler 240 is responsible for storing, modifying, and retrieving portlet preferences and modifying or deleting portlets. The WSRP persistence adapters 255 are configured to receive requests to generate, modify, and read information stored in the database 270 from the registration handler 230 and portlet management handler 240. In one embodiment, the WSRP persistence adapters 255 include separate adapters for the registration handler 230 and the portlet management handler 240. The persistence layer 260 manages access to the database by representing data in the database as objects, and allows particular data types to be accessed as such without requiring that the accessing entity have any knowledge about how said data is stored in the database. When a request to modify data, such as modifying the registration information of a consumer is received from the registration handler 230 through its persistence adapter 255, the persistence layer 265 receives the request in the form of an object modification request. The persistence layer 265 locates the various instances in the database associated with the registration information and modifies them appropriately.

The markup handler 225 is responsible for processing markup requests for the portlets 224 (requests for the visual representation of the portlets within the page). When a request from a user system is received at the consumer, for example, a page is loaded that utilizes a remote portlet, the consumer 115 requests the appropriate render data from the producer. This request includes an identity of the portlet and a listing of capabilities of the user system. The markup handler 225 receives this request and determines an appropriate portlet adapter 220 to access the referenced portlet. The portlet adapters 220 are adapters that enable portlets 224 to be accessed as remote portlets. The portlet adapters can include portlet adapters for multiple portlet types, such as JPF, Java, JSR168, and Struts portlets. In some embodiments, a portlet adapter can comprise a Java Archive (JAR) file that is inserted into a producer to enable it to interact with remote consumers in a manner similar to how the portlet would interact with a local portal.

A server module 242 generates a user interface layer that enables a user selecting a portlet on a displayed page on a producer portal to obtain configuration information for utilizing the portlet as a remote portlet. This information can be obtained by selecting the portlet with a mouse, dragging the portlet to an email window or web browser window, or through some other means such as a voice interface or touchscreen. In some embodiments, the server module 242 performs other portal display/management functions as well.

The consumer 115 includes a consumer core 275 that manages communication with the producer 125, one or more persistence adapters 288, administration tools 294, proxy portlet controls 292, a WSRP persistence layer 285, and one or more pages 296 that reference the remote portlets 224 through included proxy portlets, a server module 276, and framework tables 280.

The consumer core 275 communicates with the producer core 205 using the Simple Object Access Protocol (SOAP) or another suitable protocol. In some embodiments, the consumer and producer cores use a variant of SOAP, known as SOAP With Attachments (SWA) that enables binary files to be attached to SOAP messages. In some embodiments, the producer and consumer use HyperText Transport Protocol (HTTP) compression to reduce the size of transmitted data. The consumer core 275 receives a WSDL file from the producer 125 that it uses to configure its interaction with the producer 125. While in the present embodiment a file is used, in alternate embodiments, the configuration information can be provided in a different manner.

The framework tables 280 store information about the portlets available on the producer 125 and other portlets that is received from the service handler 210 of the producers. This information can include identifying information for the portlets, identifying information for the producer 125, capacities of the producer 125, and the types of functionality provided by the portlets. The framework table 280 also can include information about instances of proxy portlets stored on the consumer 115. When a portlet is first identified during registration/discovery a proxy portlet control 292 is created for the proxy that can be used to configure how the proxy is utilized on the consumer side.

A set of administration tools 294 enable a user or administrator of the consumer to create web pages 296 that access the remote portlets on the producer. The administrative tools insert a proxy portlet associated with a remote portlet on the producer into a created page 296 in a location that would normally refer to a portlet local to the consumer.

A server module 276 generates a user interface layer that enables a user selecting a section on one of the pages 296 to receive configuration information for utilizing a portlet on the producer 125 as a remote portlet. This information can be obtained by selecting a portlet 125 on the producer with a mouse and dragging the portlet to one of the pages 296 or through some other means such as a voice interface, touchscreen interface, or custom means. In some embodiments, the server module 276 performs other portal display/management functions as well.

A persistence layer 285 enables the admin tools and the proxy portlet controls 292 to store information about proxy portlet instances, including configuration information through their respective persistence adapters 288. This information can be retrieved, created, or modified by submitting actions to be performed on data objects to the persistence layer 285. The persistence layer receives the actions, locates the data corresponding to the objects on the framework tables 280 and retrieves and/or modifies the tables accordingly.

When a user system attempts to render a page 296 on the consumer that includes one of the remote portlets 224, the consumer transmits a GetMarkup request to the producer 125 to obtain the rendered content that should appear in the page. The request includes a handle for the portlet and capabilities of the client on the user system 105. The producer 125 utilizes one of the portlet adapters 220 to obtain the rendered content for the page from the portlet and returns the content to the consumer 115, which renders the page.

If a user system initiates an interaction with a page utilizing a remote portlet, for example by submitting a form, the consumer 115 sends to the producer the handle for the portlet, the form data storing the information stored on the form, query data indicating a requested response from the portlet, and any uploaded information. The producer 125 utilizes one of the portlet adapters 220 to submit this information to the portlet as if it had been submitted locally to the portlet. The portlet processes the request and changes its current mode/window state in response. The mode/window state indicates a state/ mode for the window displaying the portlet, such as minimized, maximized, hidden, or normal.

The producer then returns to the consumer the new window state and a new navigational state for the portlet indicating a new page to be rendered on the main page on the consumer 115. When the consumer 115 subsequently requests markup, this new page, which presumably includes the response to the submitted form, is displayed inside the viewed portal page on the consumer.

In various embodiments, the producer system 125 utilizes templates for various types of Uniform Resource Locators (URLs). The templates include embedded fields for different types of information to be provided by the producer or consumer. When URLs are passed between the producer and the consumer, they may be rewritten by the consumer or producer to reflect differences in how the URLs would be accessed from either system. For example, URL designed to be utilized by the producer might not include the domain of the producer and would only include a location in a local file system. The consumer could rewrite such a URL with a global address that included the domain of the producer. Alternately, when the consumer submits a markup or other page request to the producer, it embeds blank fields into the URL for information such as markup state, window state, interaction state, and other information. The producer then rewrites the URL with this information included.

In some embodiments, page flow portlets and struts portlets can interact directly with a user system rather than working through the consumer. As mentioned above, the producer can utilize a URL writing framework based on templates. When portlets are interacting directly with a user, one set of templates is used. When portlets interact through a consumer a separate set of templates are used. For example, when a portlet is being accessed directly by a user, a template is used that does not require rewriting by the consumer.

Figure 3:
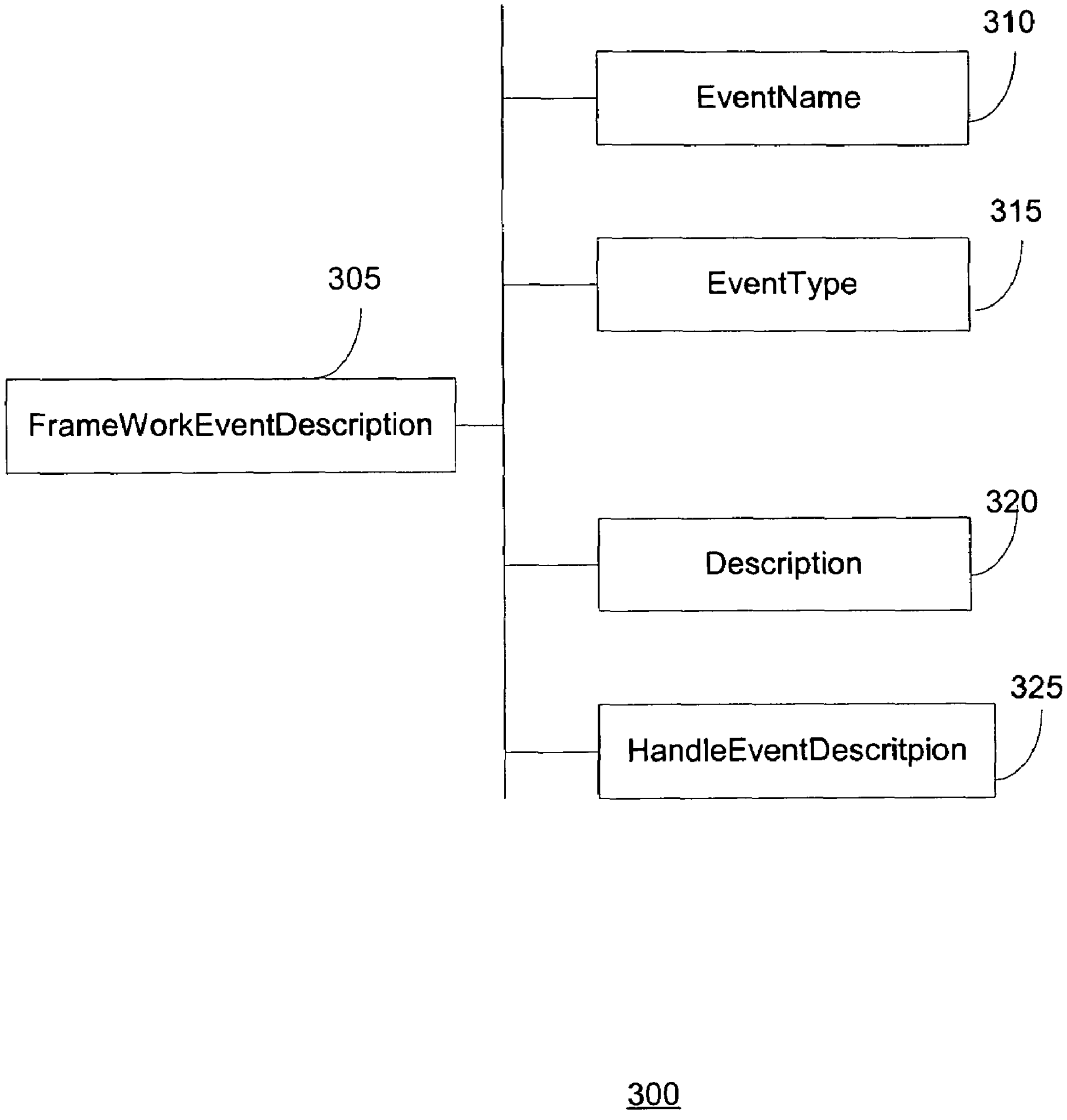
FIG. 3 illustrates a structure for an extension to a service description document in an embodiment.

FIG. 3 illustrates an example structure for a service description document in an embodiment. This service description document is used to organize events to which a portlet is responsive. These events can include any event occurring within the larger portal framework in which the portlet is functioning. The service description document parallels the structure of an event description for the producer web portal framework, thus enabling the proxy portlet to interact as if it were a local portlet.

It can include an event occurring in another portlet, an event occurring within the portlet itself, an event occurring within a page displaying the portlet, or any other portal framework event. It can include struts, java, and pageflow events as well. The event can include a change of state or mode for a portlet or a page displaying a portlet.

The service description document is an extension to a service description that is transmitted to a consumer by the producer core 205 for the purposes of utilizing a portlet as a remote portlet as discussed with respect to FIG. 1 and FIG. 2. In some embodiments, the illustrated configuration is an XML document and is a subset of a PortletDescription document. This section of the document can be transmitted to the consumer as part of a GetServiceDescription response.

The service description document includes an event name 310. The event name is an identifier, which can be a string, which is used to organize and identify the event. The event also includes an event type descriptor 315 that indicates a categorization for the event. The event additionally includes a description tag 320. The description tag provides a description of the event and can be a string describing the event. A handleEventDescription provides a complete description of the event. It includes a FrameworkEventDescription (described in FIG. 4) that provides a listing of actions that a portlet should take in response to various events.

There can be multiple iterations of the document above, each one for a different event handled by the portlet.

Figure 4:
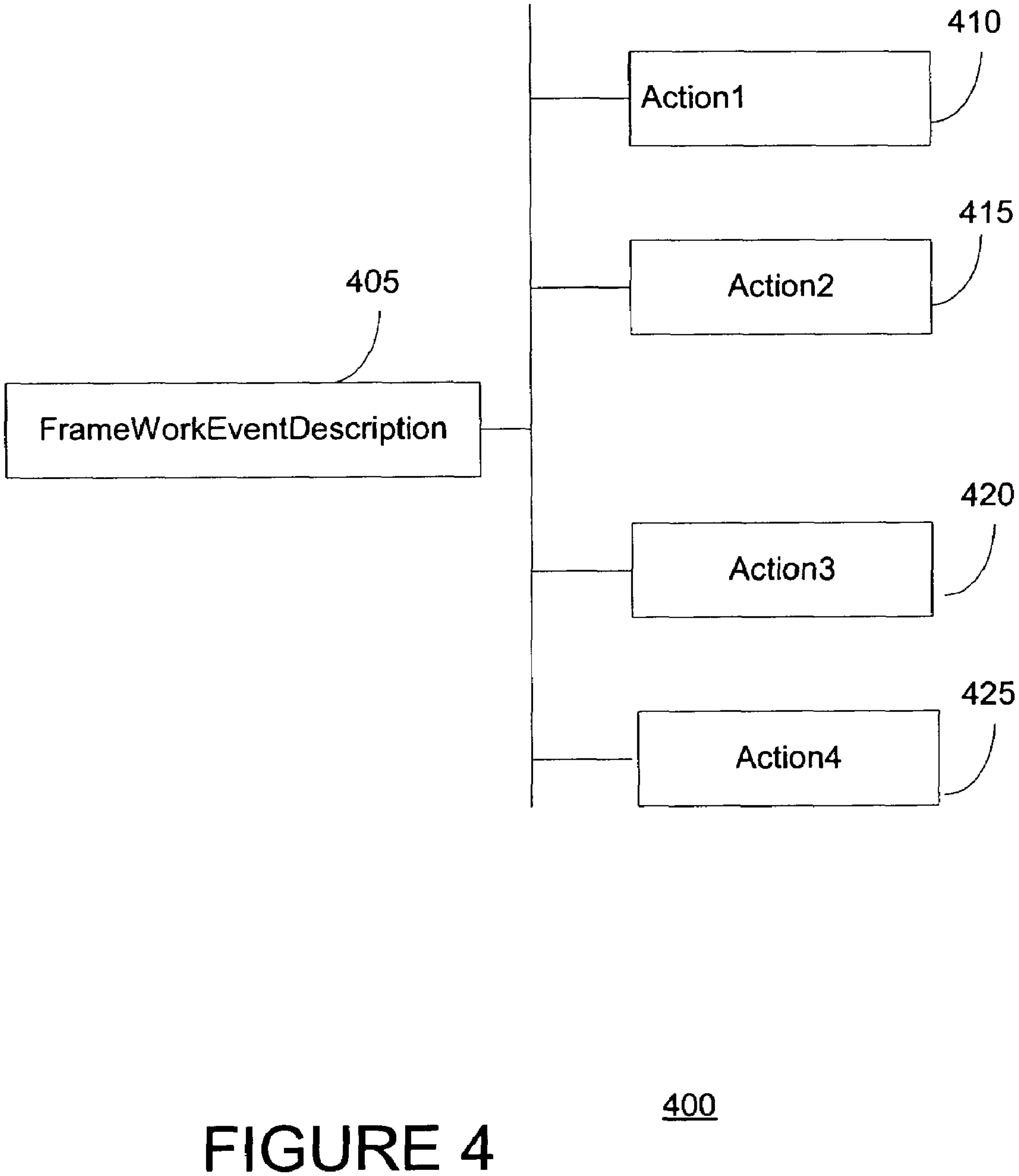
FIG. 4 illustrates another structure for an extension to a service description document in an embodiment.

FIG. 4 illustrates a structure for a service description document in an embodiment. This service description document is used to provide a full description to a recipient of an event happening within a portal framework. The structure of this document can parallel an "event handler" for the portlet on the producer system. The event handler is a set of instructions that generates a response for a portlet when an event is detected.

The service description document is an extension to a service description that is transmitted to a consumer for the purposes of utilizing a portlet as a remote portlet as discussed with respect to FIG. 1 and FIG. 2. In some embodiments, the illustrated configuration is an XML document and is a subset of a PortletDescription document. This section of the document can be transmitted to the consumer as part of a GetServiceDescription response.

The service description file includes an FrameworkEventDescriptor tag 405. This tag indicates a description of an event. The service description document indicates one or more actions 410-425. The actions indicate actions taken by the portlet or consumer in response to the event. While 5 actions are illustrated herein, it should be clear to those of ordinary skill in the art that more or fewer action can be taken.

The actions can include changes of window state and window mode, pageflow and struts actions, sending messages to remote portlets, activating or changing the state of a web page displaying the portlet, firing (announcing) an event to another portlet, or any other actions that can be taken by a portlet.

Figure 5:
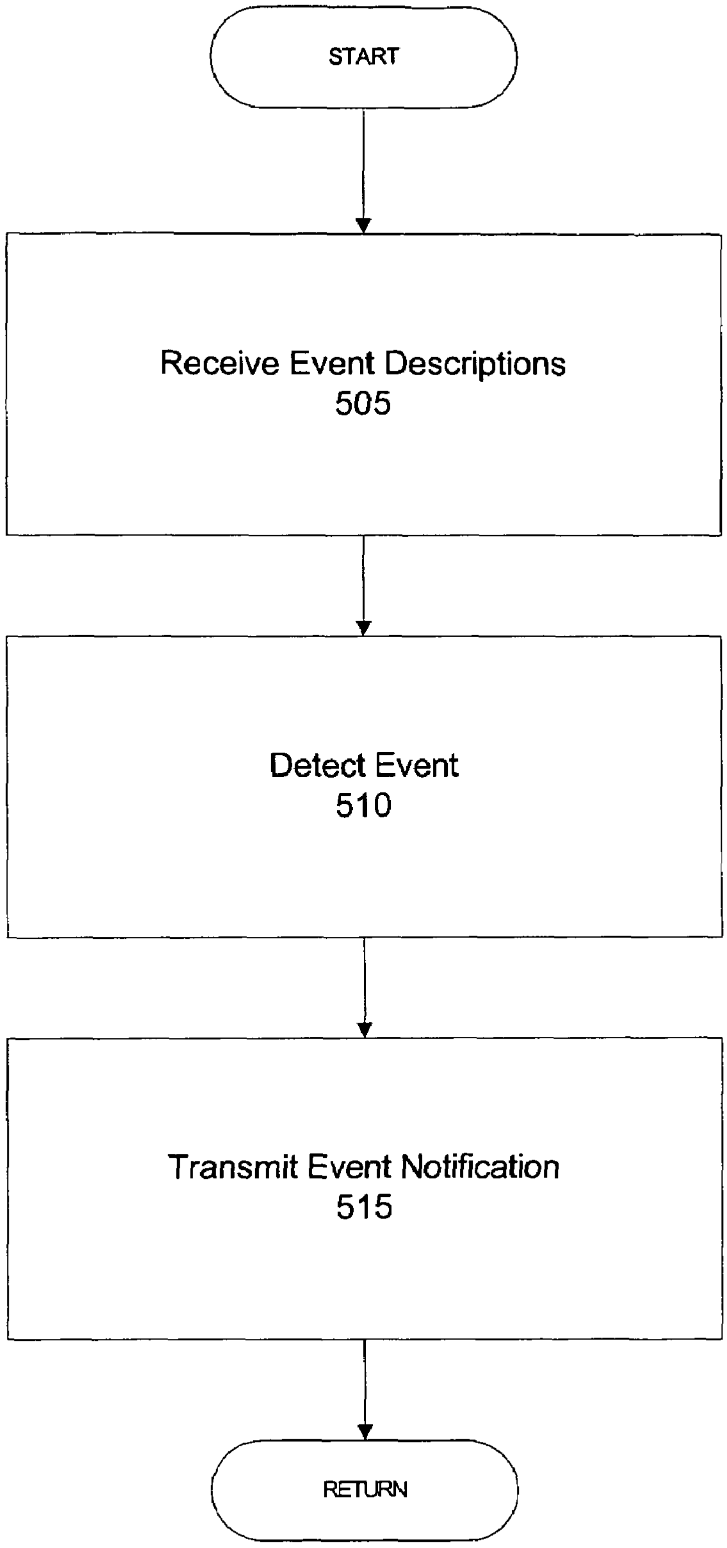
FIG. 5 is a flow chart illustrating a process for event communication in an embodiment.

FIG. 5 is a flow chart illustrating a process for event communication in an embodiment. In block (505), a consumer system receives event descriptions. Receiving event descriptions typically occurs during a discovery process, when a consumer discovers a portlet on a consumer. During receiving event descriptions processing, the producer system transmits a series of service description files that are used by the consumer to generate a proxy portlet for utilizing a remote portlet. Included in these files are the configuration documents such as those indicated in FIGS. 3 and 4. These files indicate descriptions for the events and actions that can be taken by the consumer in response to the action.

In block (510), the consumer detects the event. The event can be an event occurring within the remote portlet, an event occurring within the portal framework of the consumer, or an event occurring within another framework. In block (515), the consumer notifies the portlet of the event. In some embodiments, this entails transmitting the event to the producer during an interaction request, depending on whether the producer is needed to generate the response.

Figure 6:
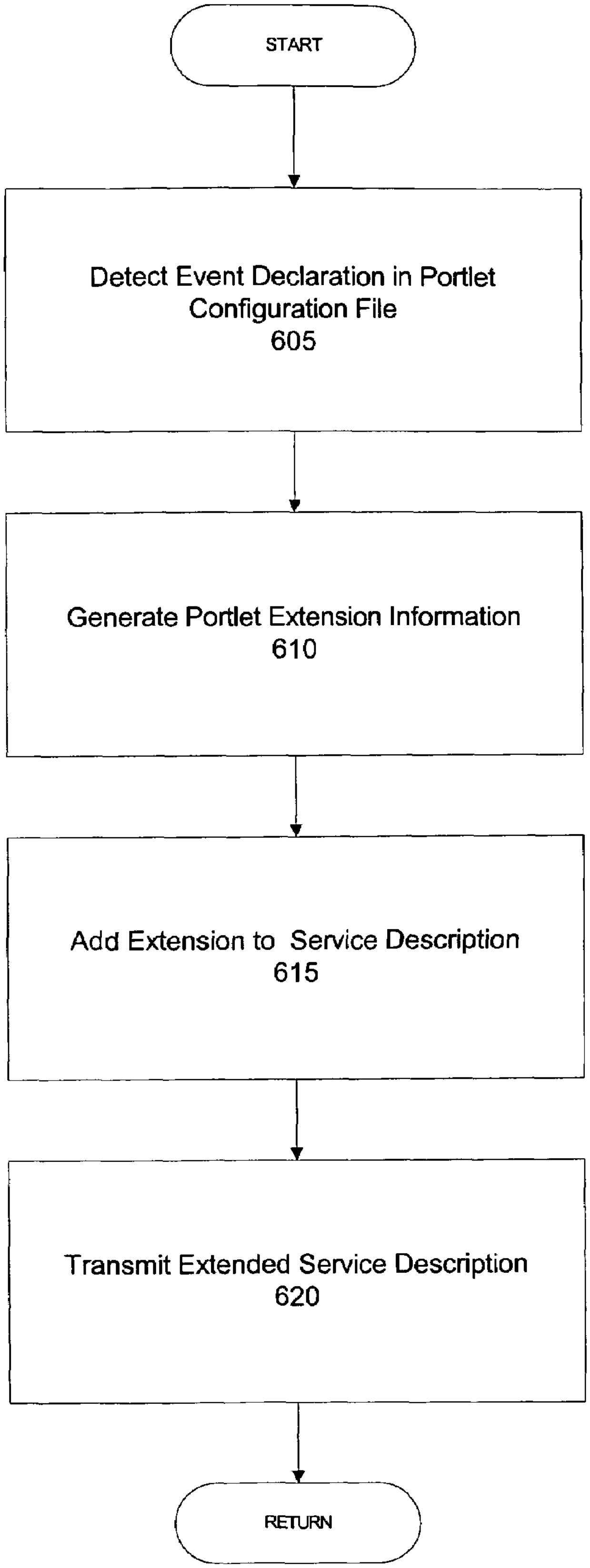
FIG. 6 is a flow chart illustrating a process for configuring a remote portlet to communicate regarding events in an embodiment.

FIG. 6 is a flow chart illustrating a process for configuring a remote portlet to communicate regarding events in an embodiment. In block (605), a producer system detects an event description in a descriptor. The producer system, when configuring the portlet to be remotely accessed, checks a descriptor for the portlet that indicates how it reacts to events in the web portal framework. In one embodiment, the descriptor is a .portlet file. The descriptor typically includes the information illustrated with respect to FIG. 3 and FIG. 4, particularly descriptions for the events.

In block (610) the producer uses the configuration information in the descriptor file to generate portlet extension information to be added to a service description. For example, for the following portlet:

```
<netuix:portlet title="Portlet" definitionLabel="jpf_eventSink">
  <netuix:handlePageFlowEvent action="action3"
    eventLabel="action3_el" description="action3 event handler">
    <netuix:invokePageFlowAction action="goToAction3"/>
    <netuix:activatePage/>
  </netuix:handlePageFlowEvent>
  <netuix:handlePageFlowEvent action="cancel"
    eventLabel="cancel_el" description="cancel event handler">
    <netuix:invokePageFlowAction action="goToCancel"/>
  </netuix:handlePageFlowEvent>
  <netuix:handleCustomEvent event="customEvent"
    eventLabel="customEvent" description="custom event handler">
    <netuix:changeWindowState newState="maximized"/>
    <netuix:invokePageFlowAction action="goToCustomEvent"/>
  </netuix:handleCustomEvent>
  <netuix:titlebar>
    <netuix:minimize/>
    <netuix:maximize/>
  </netuix:titlebar>
  <netuix:content>
    <netuix:pageflowContent
      contentUri="/events/sink/listeningPageFlow/Controller.jpf"
      action="begin"/>
  </netuix:content>
</netuix:portlet>
```

The producer system could extract the event descriptions from the portlet descriptor and, in block (610), generate an extension to the service description document for the portlet. In block (615), this extension is added to a service description document. For example, the following GetServiceDescription response can be created for the portlet above.

```
<urn:offeredPortlets>
  <urn:portletHandle>jpf_eventSink</urn:portletHandle>
  <urn:markupTypes>
    <urn:mimeType>text/html</urn:mimeType>
    <urn:modes>wsrp:view</urn:modes>
    <urn:windowStates>wsrp:normal</urn:windowStates>
    <urn:windowStates>wsrp:minimized</urn:windowStates>
    <urn:windowStates>wsrp:maximized</urn:windowStates>
    <urn:locales>en</urn:locales>
    <urn:locales>en-US</urn:locales>
  </urn:markupTypes>
  <urn:groupID>complexProducer</urn:groupID>
  <urn:description xml:lang="en-US">
    <urn:value/>
  </urn:description>
  <urn:shortTitle xml:lang="en-US">
    <urn:value> Portlet</urn:value>
  </urn:shortTitle>
  <urn:title xml:lang="en-US">
    <urn:value> Portlet</urn:value>
  </urn:title>
  <urn:displayName xml:lang="en-US">
    <urn:value> Portlet</urn:value>
  </urn:displayName>
  <urn:usesMethodGet>true</urn:usesMethodGet>
  <urn:templatesStoredInSession>true</urn:templatesStoredInSession>
  <urn:doesUrlTemplateProcessing>true</
  urn:doesUrlTemplateProcessing>
  <urn:extensions>
    <urn2:handledEvents xmlns:urn1="urn:bea:wsrp:wlp:v2:events:type"
      xmlns:urn="urn:bea:wsrp:wlp:v2:events:name"
      xmlns:urn2="urn:bea:wsrp:wlp:v2:types">
      <urn2:event>
        <urn2:eventName>urn:customEvent</urn2:eventName>
        <urn2:eventType>urn1:custom</urn2:eventType>
        <urn2:handleEventDescription onlyIfDisplayed="false"
          eventLabel="customEvent">
          <urn2:changeWindowState newState="maximized"/>
          <urn2:dispatchToRemotePortlet/>
        </urn2:handleEventDescription>
      </urn2:event>
```

-continued

```
      <urn2:event>
        <urn2:eventName>urn:action3</urn2:eventName>
        <urn2:eventType>urn1:pageflow</urn2:eventType>
        <urn2:description xml:lang="en-US">
        <urn3:value xmlns:urn3="urn:oasis:names:tc:wsrp:v1:types">
          action3 event handler</urn3:value>
        </urn2:description>
        <urn2:handleEventDescription onlyIfDisplayed="false"
          eventLabel="action3_el">
          <urn2:activatePage/>
          <urn2:dispatchToRemotePortlet/>
        </urn2:handleEventDescription>
      </urn2:event>
      <urn2:event>
        <urn2:eventName>urn:cancel</urn2:eventName>
        <urn2:eventType>urn1:pageflow</urn2:eventType>
        <urn2:description xml:lang="en-US">
          <urn3:value xmlns:urn3="urn:oasis:names:tc:wsrp:v1:types">
            cancel event handler
          </urn3:value>
        </urn2:description>
        <urn2:handleEventDescription onlyIfDisplayed="false"
          eventLabel="cancel_el">
          <urn2:dispatchToRemotePortlet/>
        </urn2:handleEventDescription>
      </urn2:event>
    </urn2:handledEvents>
  </urn:extensions>
</urn:offeredPortlets>
```

The response above includes the following modifications. For each netuix:handleXXXEvent control, the Producer adds an event element to the extension file. Additionally, for each event response that can be handled on the Consumer side (e.g. netuix:changeWindowState, netuix:changeWindowMode, netuix:activatePage, and netuix:fireCustomEvent), the Producer adds a corresponding changeWindowState, changeWindowMode, changeWindowMode, activatePage or fireCustomEvent actor in the event.

In some embodiments, certain elements can If a event has one or more event actors that must be handled by the Producer (e.g., netuix:invokePageFlowAction, netuix:invokeStrutsAction, netuix:invokeJavaPortletMethod, and netuix:invokeBackingFileMethod), the producers adds a dispatchToRemotePortlet method. This method indicates that the Consumer should dispatch the event to the Producer, which generates the correct response.

In block (620), this extended service description is transmitted to the consumer when the consumer discovers the producer and attempts to utilize the portlet as a remote portlet. Using this service description, the Consumer can create the following proxy portlet.

```
<netuix:proxyPortlet title="Actions Fire Events (Remote)"
  definitionLabel="c2p_jpf_sinkRemote"
  portletHandle="jpf_eventSink" producerHandle="complexProducer"
  doesUrlTemplateProcessing="true" templatesStoredInSession="true">
  <netuix:handlePageFlowEvent action="action3" eventLabel=
  "action3_el"
    description="action3 event handler">
    <netuix:dispatchToRemotePortlet/>
    <netuix:activatePage/>
  </netuix:handlePageFlowEvent>
  <netuix:handlePageFlowEvent action="cancel" eventLabel="cancel_el"
    description="cancel event handler">
    <netuix:dispatchToRemotePortlet/>
  </netuix:handlePageFlowEvent>
  <netuix:handleCustomEvent event="customEvent"
    eventLabel="customEvent" description="custom event handler">
    <netuix:changeWindowState newState="maximized"/>
```

-continued

```
      <netuix:dispatchToRemotePortlet/>
    </netuix:handleCustomEvent>
    <netuix titlebar>
      <netuix:minimize/>
      <netuix:maximize/>
    </netuix:titlebar>
    <netuix:proxyPortletContent/>
</netuix:proxyPortlet>
```

If the Producer returns an eventDescription without frameworkEventDescrption, the proxy portlet will be unable to respond to actions, since it does not have the prescribed responses included in the frameworkEventDescritpion file. In such a case, the proxy portlet should include a dispatchToRemotePortlet method for each event, thus enabling the consumer to check with the producer for the prescribed response.

Figure 7:
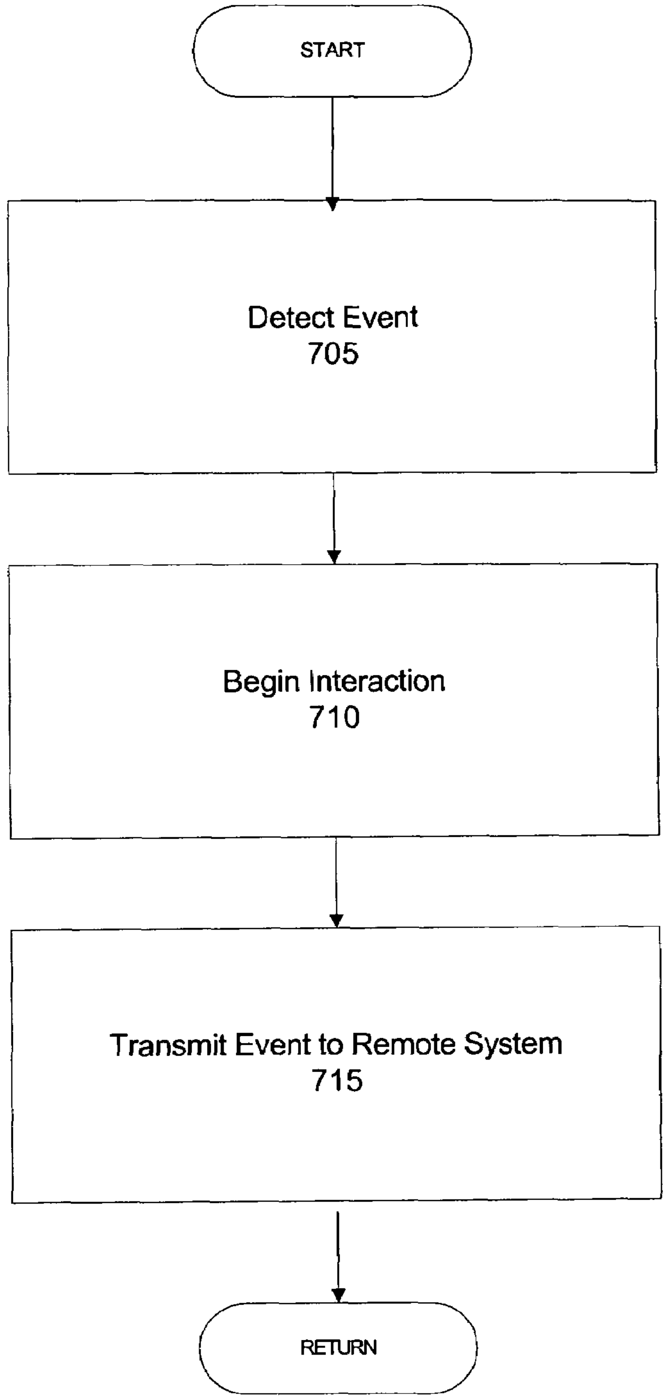
FIG. 7 is a flow chart illustrating a process for communicating an event to a remote portlet in an embodiment.

FIG. 7 is a flow chart illustrating a process for communicating an event in an embodiment. In block (705), the event is detected by the consumer. In one embodiment, this is an event occurring within the portal framework of the consumer. It can occur within the portlet itself, a page displaying the portlet, or another portlet displayed on the consumer. In some embodiments the consumer can utilize a "listening" portlet that aggregates events occurring in other portlets and reporting them.

In block (710), an interaction is begun. Under WSRP a performBlockingInteraction method is used to allow portlets to make state and mode changes. In other embodiments, different types of interactions can be utilized. In block (715), the event is transmitted. In some embodiments, the event is transmitted to the portlet from the consumer. The transmission of the event typically includes an event name, an event type, and a payload, the payload including an XML document containing any variable values for the event.

The portlet then processes the response. For portlets that have a FrameworkEventDescriptor, they utilize the responses to react to the event. For portlets, that do not have a FrameworkEventDescriptor, the dispatchToRemotePortlet method is used to dispatch the event to the producer, which provides the appropriate response to the portlet and consumer. This dispatching can also occur during an interaction request, when the consumer and producer communicate.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for enabling a portlet to function with a remote consumer system, the method comprising:

detecting within a descriptor file for the portlet one or more event data structures, each of the one or more event data structures describing at least one event occurring within a web portal environment comprising at least the portlet and the remote consumer system, and each of the one or more event data structures also describing one or more actions to be taken by the portlet or the remote consumer system in response to the at least one event;

generating, for each of the event data structures in the descriptor file for the portlet, a corresponding service data structure within a service description for the remote consumer system, the service data structure including the at least one event and one or more actors corresponding to the one or more actions to be taken, the service description configured to enable the remote consumer system to communicate with the portlet; and transmitting the service description having the service data structure to the remote consumer system, for use by the remote consumer system to create, based on the service description, a proxy for the portlet at the remote consumer system.

2. The method of claim 1, wherein detecting within a descriptor file for the portlet one or more event data structures comprises:

detecting one or more event data structures within an eXtensible Markup Language (XML) document associated with the portlet.

3. The method of claim 2, wherein detecting one or more event data structures within an eXtensible Markup Language (XML) document associated with the portlet comprises:

detecting entries associated with tags within the XML document.

4. The method of claim 3, wherein detecting entries associated with tags within the XML document comprises:

detecting within individual entries, instructions for responding to the event.

5. The method of claim 1, wherein generating, for each of the event data structures in the descriptor file for the portlet, a corresponding service data structure within a service description for the remote consumer system comprises:

generating, for each of the event data structures in the descriptor file for the portlet, an extension to a PortletDescription document.

6. The method of claim 1, wherein the portlet is at least one of a pageflow portlet and a struts portlet.

7. A machine readable storage medium comprising instructions that when executed by a processor are configured to:

detect within a descriptor file for the portlet one or more event data structures, each of the one or more event data structures describing at least one event occurring within a web portal environment comprising at least the portlet and the remote consumer system, and each one of the one or more event data structures also describing one or more actions to be taken by the portlet or the remote consumer system in response to the at least one event;

generate, for each of the event data structures in the descriptor file for the portlet, a corresponding service data structure within a service description for the remote consumer system, the service data structure including the at least one event and one or more actors corresponding to the one or more actions to be taken, the service description configured to enable the remote consumer system to communicate with the portlet; and transmit the service description having the service data structure to the remote consumer system, for use by the remote consumer system to create, based on the service description, a proxy for the portlet at the remote consumer system.

8. The machine readable storage medium of claim 7, wherein the instructions for detecting within a descriptor file for the portlet one or more event data structures comprise instructions for:

detecting one or more event data structures within an eXtensible Markup Language (XML) document associated with the portlet.

9. The machine readable storage medium of claim 8, wherein the instructions for detecting one or more event data structures within an eXtensible Markup Language (XML) document associated with the portlet comprise instructions for:

detecting entries associated with tags within the XML document.

10. The machine readable storage medium of claim 9, wherein the instructions for detecting entries associated with tags within the XML document comprise instructions for:

detecting, within individual entries, instructions for responding to the event.

11. The machine readable storage medium of claim 7, wherein the instructions for generating, for each of the event data structures in the descriptor file for the portlet, a corresponding service data structure within a service description for the remote consumer system comprise instructions for:

generating, for each of the event data structures in the descriptor file for the portlet, an extension to a PortletDescription document.

12. The machine readable storage medium of claim 7, wherein the portlet is at least one of a pageflow portlet and a struts portlet.

13. A system, the system interacting with a portlet and a remote consumer system and configured to:

detect within a descriptor file for the portlet one or more event data structures, each of the one or more event data structures describing events within a web portal environment comprising at least the portlet and the remote consumer system, and each of the one or more event data structures also describing one or more actions to be taken by the portlet or the remote consumer system in response to the event; and for each of the event data structures in the descriptor file for the portlet generate a corresponding service data structure within a service description for the remote consumer system, the service data structure including the events and one or more actors corresponding to the one or more actions to be taken, the service description configured to enable the remote consumer system to communicate with the portlet; and transmit the service description having the service data structure to the remote consumer system, for use by the remote consumer system to create, based on the service description, a proxy for the portlet at the remote consumer system;

wherein the system runs on one or more processors.

14. The method of claim 1, wherein:

the one or more actions described by one of the one or more event data structures include dispatching the at least one event to the portlet so that the portlet is able to handle the at least one event.

15. The method of claim 1, further comprising:

receiving, from the remote consumer system, the at least one event; and invoking an action in response to receiving the at least one event.

16. The method of claim 1, wherein:

the proxy for the portlet references the portlet so that the portlet is accessible at the remote consumer system via the proxy for the portlet.

17. The method of claim 1, wherein:

the service description configures the proxy for the portlet so that the proxy for the portlet invokes the one or more actions in response to the at least one event.

* * * * *

UNITED STATES PATENT AND TRADEMARK OFFICE

CERTIFICATE OF CORRECTION

PATENT NO. : 7,574,712 B2
APPLICATION NO. : 11/281183
DATED : August 11, 2009
INVENTOR(S) : Subrahmanyam Allamaraju et al.

It is certified that error appears in the above-identified patent and that said Letters Patent is hereby corrected as shown below:

On sheet 3 of 7, in Figure 3, Box No. 325, line 1, delete “Descritpion” and insert -- Description --, therefor.

In column 1, line 31-32, delete “SYSTEM METHOD” and insert -- SYSTEM AND METHOD --, therefor.

In column 1, line 34, delete “16,2005,” and insert -- 16, 2005, --, therefor.

In column 1, line 35, delete “applicaticn” and insert -- application --, therefor.

In column 1, line 37, delete “COMMUMCATIONS,” and insert -- COMMUNICATIONS, --, therefor.

In column 1, line 37, delete “Christother” and insert -- Christopher --, therefor.

In column 1, line 41-42, delete “Subrabmanyam” and insert -- Subrahmanyam --, therefor.

In column 1, line 44-45, delete “SYSTEM METHOD” and insert -- SYSTEM AND METHOD --, therefor.

In column 1, line 47, delete “16 2005,” and insert -- 16, 2005, --, therefor.

In column 11, line 5, delete “<netuix titlebar>” and insert -- <netuix:titlebar> --, therefor.

Signed and Sealed this

Twentieth Day of July, 2010

David J. Kappos
*Director of the United States Patent and Trademark Office*

UNITED STATES PATENT AND TRADEMARK OFFICE

CERTIFICATE OF CORRECTION

PATENT NO. : 7,574,712 B2
APPLICATION NO. : 11/281183
DATED : August 11, 2009
INVENTOR(S) : Allamaraju et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 814 days.

Signed and Sealed this

Seventh Day of September, 2010

David J. Kappos

*Director of the United States Patent and Trademark Office*